United States Patent
Aburomia

(12)
(10) Patent No.: US 6,249,561 B1
(45) Date of Patent: *Jun. 19, 2001

(54) COMBINATION CONTAINMENT COOLING AND RESIDUAL HEAT REMOVAL CONDENSER SYSTEM FOR NUCLEAR REACTORS

(75) Inventor: Momtaz Mahdi Aburomia, Palo Alto, CA (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/556,171

(22) Filed: Nov. 9, 1995

(51) Int. Cl.[7] .................................................. G21C 15/18
(52) U.S. Cl. ............................................. 376/283; 376/299
(58) Field of Search .................................. 376/299, 298, 376/283, 282

(56) References Cited

U.S. PATENT DOCUMENTS

| | | | |
|---|---|---|---|
| 5,082,619 | * | 1/1992 | Sawyer ................................. 376/283 |
| 5,102,617 | * | 4/1992 | Gluntz et al. ........................ 376/283 |
| 5,158,742 | * | 10/1992 | Dillmann .............................. 376/299 |
| 5,169,595 | * | 12/1992 | Cooke .................................. 376/282 |
| 5,282,230 | * | 1/1994 | Billig et al. ......................... 376/283 |
| 5,295,168 | * | 3/1994 | Gluntz et al. ........................ 376/283 |
| 5,345,481 | * | 9/1994 | Oosterkamp ......................... 376/299 |
| 5,349,616 | * | 9/1994 | Nakayama et al. .................. 376/282 |
| 5,377,242 | * | 12/1994 | Carlton et al. ....................... 376/282 |
| 5,377,243 | * | 12/1994 | Hill ...................................... 376/283 |

FOREIGN PATENT DOCUMENTS

| | | | |
|---|---|---|---|
| 57-69289 | * | 4/1982 | (JP) ..................................... 376/283 |
| 4098198 | * | 3/1992 | (JP) ..................................... 376/283 |

* cited by examiner

*Primary Examiner*—Harvey E. Behrend
(74) *Attorney, Agent, or Firm*—Armstrong Teasdale LLP

(57) ABSTRACT

Combination primary containment cooling system and residual heat removal steam condensers (PCCS-CND) operable in a containment cooling mode and in a reactor vessel cooling mode are described. In the containment cooling mode, the PCCS-CND interfaces with the primary containment vessel (PCV) through an isolation valve which can be normally closed or open. In the normally closed valve position, and upon receipt of a high drywell pressure signal, the valve opens allowing the steam in the PCV to flow to the PCCS-CND where it condenses, and the decay heat is transferred to the condenser pool. In the normally open valve position, the PCCS-CND is in the standby containment cooling mode of operation. In the reactor pressure vessel (RPV) cooling mode, the PCCS-CND interfaces with the RPV through isolation valves. Upon receipt of a high temperature signal from the suppression pool or through an operator action, the isolation valves are opened allowing the steam in the RPV to flow to the PCCS-CND where it condenses, and the decay heat is transferred to the condenser pool.

20 Claims, 3 Drawing Sheets

COMBINATION CONTAINMENT COOLING AND RESIDUAL HEAT REMOVAL CONDENSER SYSTEM FOR NUCLEAR REACTORS

FILED OF THE INVENTION

This invention relates generally to safety systems for boiling water nuclear reactors and, more particularly, to a combination primary containment cooling and residual heat removal steam condenser system.

BACKGROUND OF THE INVENTION

Boiling water nuclear reactors (BWRs) typically utilize active safety systems to control and mitigate accident events. Such safety systems transport reactor decay heat to the ultimate heat sink, which is normally sea or fresh water. Active safety systems, for example, have both high-pressure and low-pressure pumping equipment. Such active systems require maintenance and surveillance testing of the safety related equipment. In addition, the pumps and other equipments typically require AC power to operate.

An alternative to an active safety system is a passive system. Totally passive safety systems have been studied for use in BWRs because of their merits in reducing maintenance and surveillance testing of the safety-related equipment, and in eliminating the need for AC power, thereby improving the reliability of BWR operation and safety. Simplified BWRs (SBWRs) have been configured to include totally passive safety features that provide more resistance to human error in accident control and mitigation.

There are, however, some tradeoffs when employing totally passive safety systems in BWRs. Due to their passive nature, the totally passive system, when configured in accordance with nuclear standards of system separation and diversity, substantially add to plant size and cost. Therefore, passive system applications to BWRs have been limited to small- and medium-sized plants having up to about 1000 MWe output.

A combination active and passive system is described in U.S. Pat. No. 5,426,681, which is assigned to the present assignee and incorporated herein, in its entirety, by reference. The system described in the above referenced patent provides many advantages, however, such system has separate passive containment cooling systems (PCCS) units and separate reactor heat removal steam condenser (RHR-CND) systems. Such separate systems are located in separate compartments of a condenser pool and add to the plant size and cost.

It would be desirable to provide a safety system for a nuclear reactor which is highly reliable and satisfies safety requirements yet has fewer safety components. For example, it would be desirable to provide PCCS and RHR-CND systems which perform the same functions as known PCCS and RHR-CND systems yet require less space and few components than such known systems.

SUMMARY OF THE INVENTION

These and other objects are attained by a combination primary containment cooling system and residual heat removal condenser (PCCS-CND) operable in a containment cooling mode and in a reactor vessel cooling mode are described. In the containment cooling mode, the PCCS-CND interfaces with the primary containment vessel (PCV) through an isolation valve, and upon receipt of a high drywell pressure signal, the valve opens allowing the steam in the PCV to flow to the PCCS-CND where it condenses. The decay heat is transferred to the condenser pool.

In the reactor pressure vessel (RPV) cooling mode, the PCCS-CND interfaces with the RPV through isolation valves. Upon receipt of a high temperature signal from the suppression pool or through an operator action, the isolation valves are opened allowing the steam in the RPV to flow to the PCCS-CND where it condenses. As in the containment cooling mode, the decay heat is transferred to the condenser pool.

The combination PCCS-CND performs both functions of containment cooling and reactor vessel cooling. The number of components required to satisfy the BWR safety requirements of decay heat removal therefore is reduced, resulting ultimately in reducing plan size and cost. In addition, the subject PCCS-CND can be used to provide backup depressurization of the RPV, and provide backup heat removal and inventory control for events such as station blackout and reactor isolation. Further, the steam condensate from the subject PCCS-CND is allowed to discharge to either the suppression pool or to a collection tank located in the PCV. The collected condensate can be utilized as a source of water inventory for flooding the lower drywell during a postulated severe accident, or back to the reactor vessel for long term core cooling.

DETAILED DESCRIPTION OF THE DRAWINGS

The present invention, in one form, is a combination primary containment cooling system (PCCS) and residual heat removal (RHR) system which provides containment cooling in the case of a high energy line break in the containment, and which provides reactor vessel cooling in the case of reactor isolation. Although the system is described herein in specific reactor constructions, it should be understood that such system may be utilized in other reactor constructions.

Figure 1:
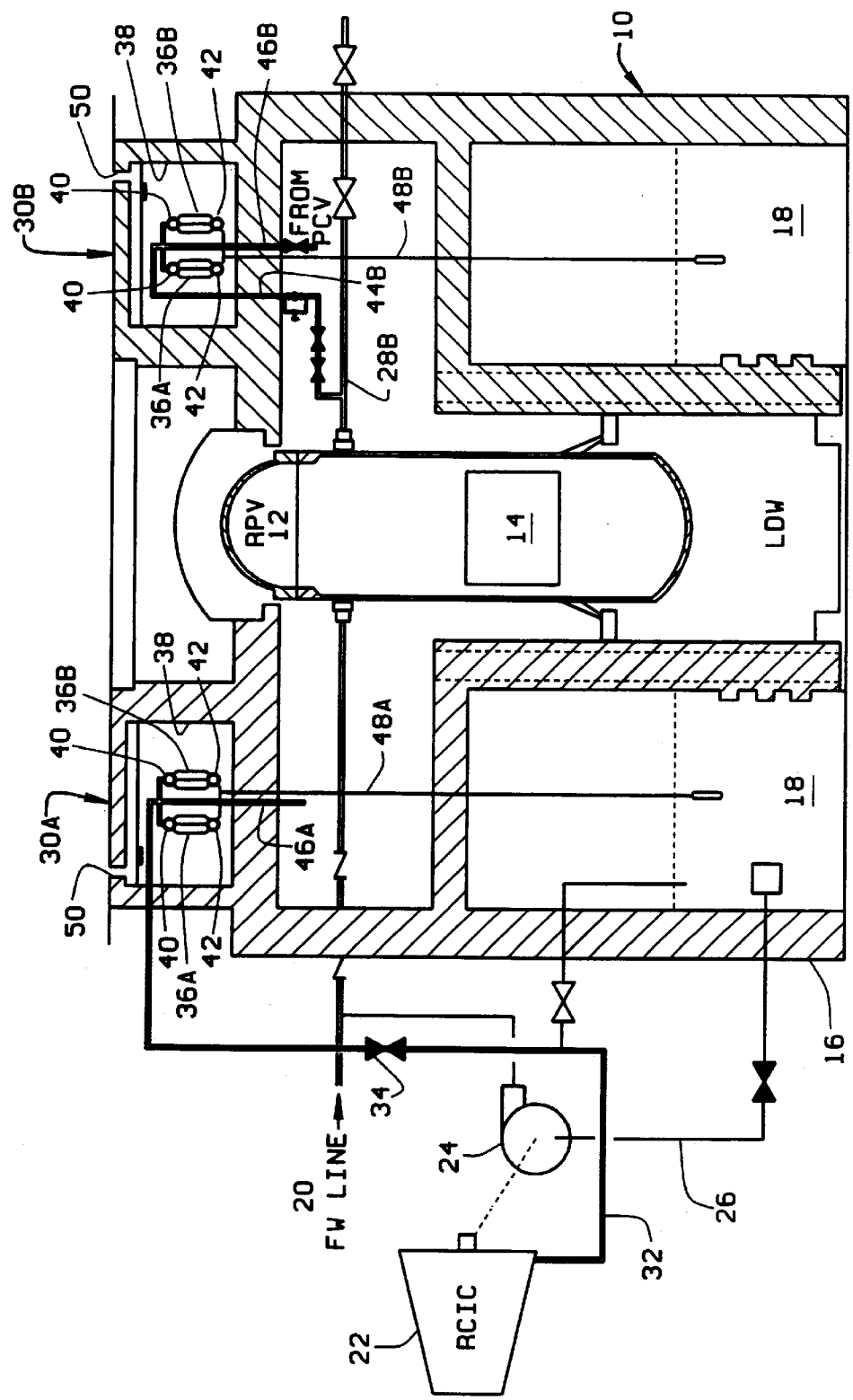
FIG. 1 is a schematic depiction of a nuclear reactor system having combined PCCS and RHR-CND units in accordance with one embodiment of the present invention.

FIG. 1 is a schematic depiction of a nuclear reactor system 10 in accordance with one embodiment of the present invention. System 10 includes a reactor pressure vessel (RPV) 12, including a core 14, a primary containment vessel (PCV) 16, and a suppression pool 18. A feedwater (FW) line 20 supplies water to RPV 12. Steam turbine 22 is coupled to, and drives, a high pressure pump 24. Pump 24 is coupled, by line 26, to suppression pool 18, and pumps water from suppression pool 18 to feedwater (FW) line 20. A steam line 28 carries steam away from RPV 12.

Also shown in FIG. 1 are two combination primary containment cooling system and residual heat removal-condenser systems 30A and 30B, sometimes referred to herein as PCCS/RHR-CND units, PCCS-RHR units, or simply as PCCS-CND 30A and 30B. PCCS-CND 30A is shown as being coupled to turbine 22 via cooling line, or flowpath, 32 and valve 34. With such a configuration, PCCS-CND 30A may be utilized for cooling exhaust of turbine 22 when valve 34 is opened. Of course, such exhaust cooling is not necessarily required in all applications and is shown in FIG. 1 merely to illustrate a contemplated additional use of PCCS-CND 30A.

PCCS-CND 30A and 30B include condensers, or heat exchangers, 36A and 36B that condense steam and transfer heat to water in a large condenser pool 38 which is vented to atmosphere. Each condenser 36A and 36B is submerged in a respective compartment of condenser pool 38 located high in the reactor building at approximately the same elevation as the fuel pools. Condenser pool 38 is above and outside of PCV 16. PCCS-CND 30A and 30B are shown positioned on opposite sides of RPV 12. PCCS-CND 30A and 30B could, of course, be positioned at many other locations relative to RPV 12. Further, additional PCCS-CND units could be used. For example, a third PCCS-CND unit could be located adjacent to, but behind, PCCS-CND 30B.

Each condenser 36A and 36B is coupled to an upper drum 40 and a lower drum 42. Steam enters PCCS-CND 30A and 30B through lines, or flowpaths, 44A (not shown) and 44B coupled to steam line 28A (not shown) and 28B, respectively. A steam-gas mixture may also enter PCCS-CND 30A and 30B through lines, or flowpaths, 46A and 46B from PCV 16. In the embodiment shown in FIG. 1, a steam-water mixture may also enter PCCS-CND 30A through line 32 from turbine 22. The steam is condensed in condensers 36A and 36B and falls to lower drum 42. From lower drum 42, the steam condensate and the noncondensable gases can be drained and vented through common lines 48A and 48B having outlets which are submerged in suppression pool 18.

Heat from PCCS-CND 30A and 30B causes condenser pool 38 temperature to rise to a point where the condenser pool water will boil. Condenser pool water can heat up to about 101° C. (214° F.). The steam which is formed, being nonradioactive and having a slight positive pressure relative to station ambient pressure, is vented from the steam space above each PCCS-CND 30A and 30B to outside the reactor building via discharge vents 50. A moisture separator may be installed at the entrance to discharge vents 50 to preclude excessive moisture carryover and loss of condenser pool water.

Condenser pool make-up clean water supply for replenishing the level is provided from a so-called "make-up demineralized system" (not shown). Level control is accomplished by using an air-operated valve in the make-up water supply line. The valve opening/closing is controlled by a water level signal sent by a level transmitter sensing water level in the condenser pool.

Cooling/clean-up of the condenser pool water is performed by a fuel and auxiliary pools cooling system (not shown). Several suction lines, at different locations, draw water from the sides of the condenser pool at an elevation above the minimum water level that is required to be maintained during normal plant operation. The water is cooled/cleaned and then returned to the condenser pool. On the return line for condenser pool water recirculation flow, there is also a postLOCA pool water make-up connection.

Figure 2:
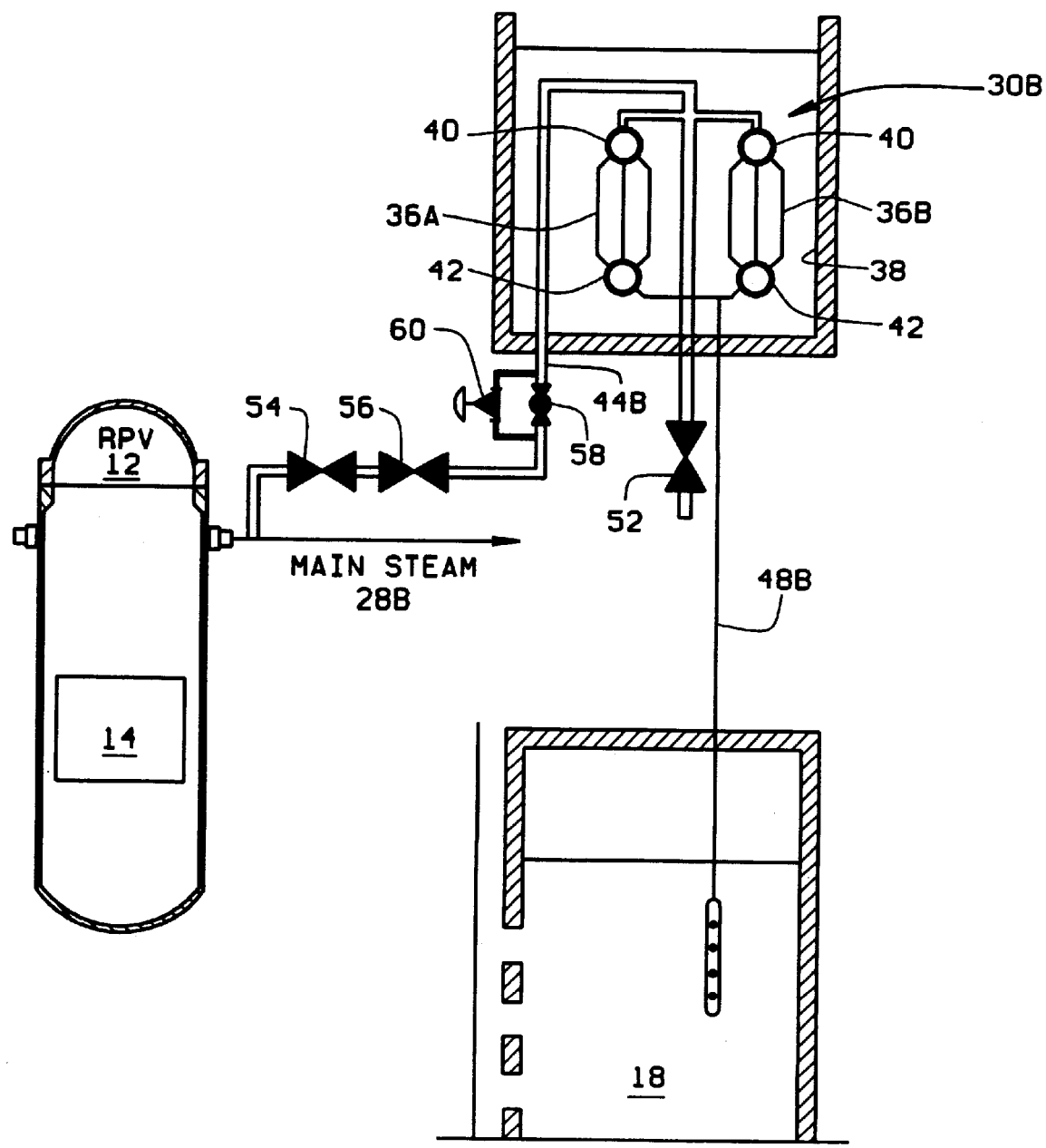
FIG. 2 is a schematic depiction of a combination PCCS-CND unit and valve controls in accordance with one embodiment of the present invention.

PCCS-CND 30B is shown in detail in FIG. 2, and the following discussion regarding PCCS-CND 30B applies also to PCCS-CND 30A. More particularly, and referring to FIG. 2, PCCS-CND 30B is operable in a containment cooling mode or in a reactor vessel cooling mode. In the containment cooling mode, PCCS-CND 30B interfaces with the primary containment vessel (PCV) through isolation valve 52. Upon receipt of a high drywell pressure signal, valve 52 opens automatically allowing the steam in the PCV to flow to PCCS-CND 30B where it condenses, and the decay heat is transferred to condenser pool 38. Alternatively, valve 52 can be configured to be normally open, and unit PCCS-CND 30B will be in the standby containment cooling mode.

In the reactor vessel cooling mode, PCCS-CND 30B interfaces with the RPV through isolation valves 54 and 56. Upon receipt of a high temperature signal from suppression pool 18 or through an operator action, isolation valves 54 and 56 are opened allowing the steam in the RPV to flow to PCCS-CND 30B where it condenses, and the decay heat is transferred to condenser pool 38. Pressure control valve 58, or as an alternative, an appropriately designed flow orifice valve, is located in the piping upstream of the isolation valve 54 for the purpose of controlling the steam flow to PCCS-CND 30B. A bypass valve 60, located in parallel with pressure control valve 58, is allowed to open at a low steam flow to maintain continual decay heat removal capability of PCCS-CND 30B at low pressures.

Figure 3:
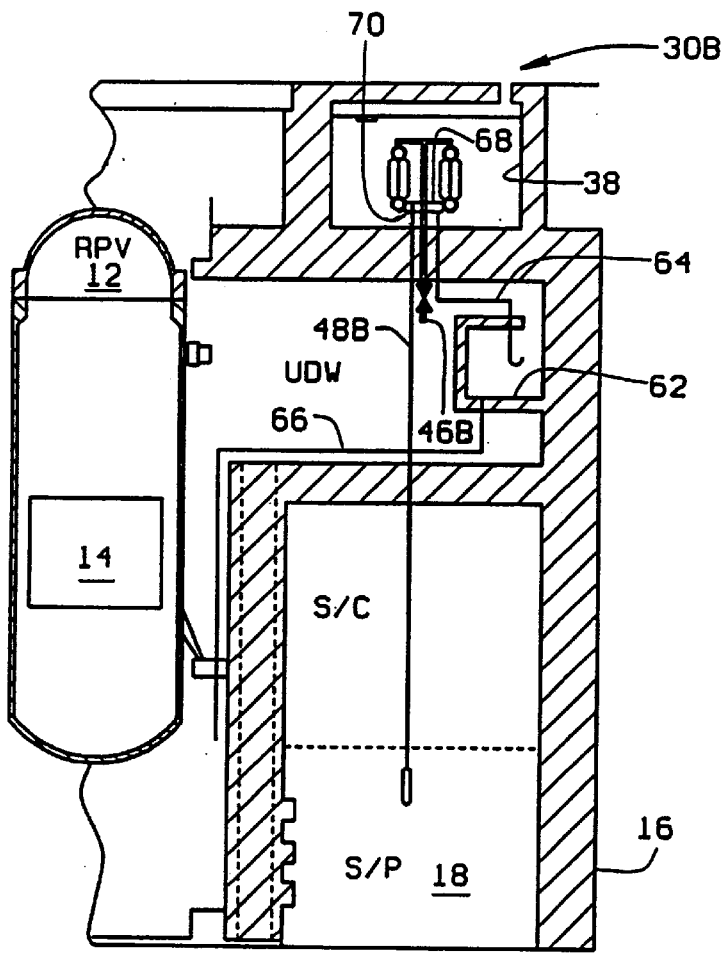
FIG. 3 schematically depicts one alternative arrangement of a combination PCCS-CND unit in accordance with the present invention.

The steam condensate from PCCS-CND 30B is allowed to discharge to either suppression pool 18 or as shown in FIG. 3, to a collection tank 62, via line, or flowpath, 64, located within containment 16. Collection tank 62 is a gravity-driven cooling pool of water located at an elevation above nuclear fuel core 14. The collected condensate in tank 62 from PCCS-CND 30B can be utilized as a source of water inventory for flooding the lower drywell during a postulated severe accident, via line 66, or fed back to reactor vessel 12 for long term core cooling via a line (not shown) extending from tank 62 to RPV 12. With respect to the FIG. 3 configuration, PCCS-CND 30B includes a first output line 68 and a second output line 70. First output line 68 is coupled to suppression pool 18, via output line, or flowpath, 48B, and transmits gases thereto. Water is transmitted via output line, or flowpath, 70 to pool 62.

Figure 4:
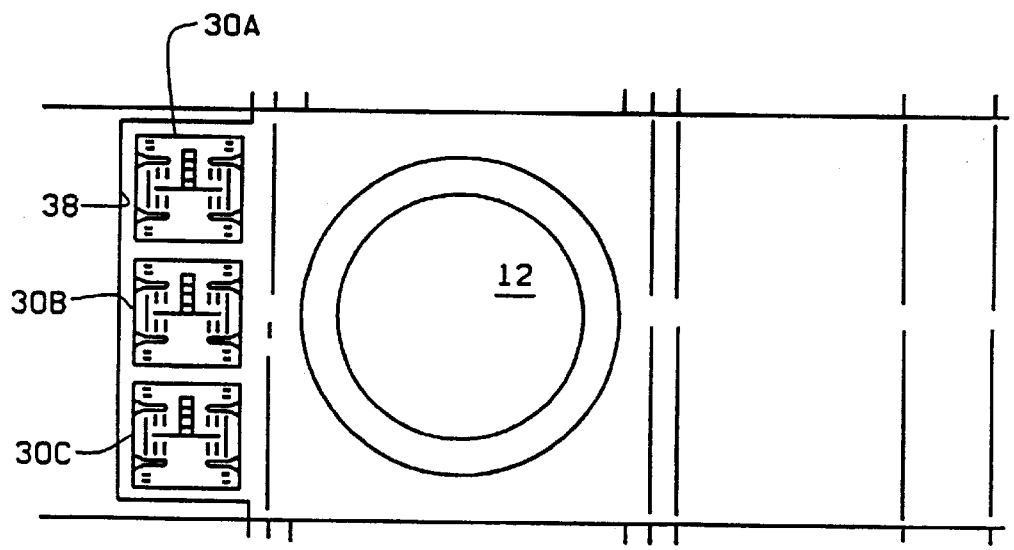
FIG. 4 schematically depicts another alternative configuration of combination PCCS-CND units in accordance with the present invention.

An alternative configuration having three PCCS-CND 30A, 30B and 30C is shown in FIG. 4. PCCS-CND 30C is configured substantially identically as PCCS-CND 30B. Specifically, and referring to FIG. 4, each PCCS-CND 30A, 30B and 30C is located on one side of RPV 14 in a respective subcompartment of condenser pool 38. All pool subcompartments communicate to enable full utilization of the collective water inventory, independent of the operational status of any given subloop. A valve is provided at the bottom of each condenser pool subcompartment that can be closed so the respective subcompartment can be emptied of water to allow condenser maintenance.

The combination PCCS-CND described herein performs both functions of containment cooling and reactor vessel cooling. The number of components required to satisfy the BWR safety requirements of decay heat removal therefore is reduced, thereby reducing the number of required safety components and resulting ultimately in reducing plan size and cost. In addition, the subject PCCS-CND, in conjunction with an active reactor inventory supply system such as the reactor core isolation cooling system "RCIC", a high-pressure core flooder system "HPCF", or an AC-independent water addition system "ACIWA", can be used to provide backup depressurization of the RPV, and provide backup heat removal and inventory control for events such as station blackout and reactor isolation. This is a low to medium pressure system which is unique in operation relative to past isolation condenser (high pressure) and passive containment cooling (low pressure system).

Further, the steam condensate from the subject PCCS-CND is allowed to discharge to either the suppression pool or to a collection tank located in the PCV. The collected condensate can be utilized as a source of water inventory for flooding the lower drywell during a postulated severe accident, or back to the reactor vessel for long term core cooling. Moreover, the subject PCCS-CND can be utilized as a separate system for decay heat removal in a completely passive BWR, or in conjunction with active RHR systems in a combined active/passive BWR design.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A boiling water reactor comprising:
    a primary containment vessel;
    a reactor pressure vessel surrounded by said primary containment vessel;
    a nuclear fuel core arranged inside said reactor pressure vessel;
    a single pool of water located inside said primary containment vessel and outside said reactor pressure vessel;
    a condenser pool of water located outside and above said primary containment vessel;
    a first combination primary containment cooling system and residual heat removal condenser submerged in said condenser pool and having an input and a single output, said input connected to said condenser through an upper drum, and said single output connected to said condenser through a lower drum;
    a first line extending from said reactor pressure vessel to said input of said first combination unit;
    a second line extending from said primary containment vessel to said input of said first combination unit; and
    a third single output line for carrying condensed steam and noncondensable gases from said single output of said first combination unit to said single pool located inside said primary containment vessel, said third single output line extending from said single output of said first combination unit to said pool located inside said primary containment vessel, said third single output line having an output end submerged in said single pool located inside said primary containment.

2. A boiling water reactor in accordance with claim 1 wherein said first line comprises a portion of a main steam line from said reactor pressure vessel.

3. A boiling water reactor in accordance with claim 2 further comprising at least one isolation valve in said first line, said isolation valve having an open and a closed state, when said isolation valve is in said open state, steam is allowed to flow through said first line to said combination primary containment cooling system and residual heat removal condenser, and when said valve is in said closed state, steam is not allowed to flow through said first line to said combination primary containment cooling system and residual heat removal condenser.

4. A boiling water reactor in accordance with claim 3 further comprising a pressure relief valve located in said first line upstream of said at least one isolation valve.

5. A boiling water reactor in accordance with claim 4 wherein said upstream valve is a pressure control valve.

6. A boiling water reactor in accordance with claim 4 wherein said upstream valve is a flow orifice valve.

7. A boiling water reactor in accordance with claim 4 further comprising a bypass valve located in said first line and in parallel with said pressure relief valve.

8. A boiling water reactor in accordance with claim 1 further comprising an isolation valve located in said second line from said primary containment vessel to said input of said first combination unit.

9. A boiling water reactor in accordance with claim 1 wherein said pool of water located inside said primary containment vessel and outside said reactor pressure vessel is a suppression pool.

10. A boiling water reactor in accordance with claim 1 wherein said single pool of water located inside said primary containment vessel and outside said reactor pressure vessel comprises a suppression pool of water.

11. A boiling water reactor in accordance with claim 1 further comprising a second combination primary containment cooling system and residual heat removal condenser submerged in said condenser pool and having an input and a single output, a fourth line extending from said reactor pressure vessel to said input of said second combination unit, a fifth line extending from said primary containment vessel to said input of said second combination unit, and a sixth single output line for carrying condensed steam and noncondensable gases from said single output of said second combination unit to said single pool located inside said primary containment vessel, said sixth single output line extending from said single output of said second combination unit to said single pool located inside said primary containment vessel, said sixth single output line having an output end submerged in said single pool located inside said primary containment.

12. A boiling water reactor in accordance with claim 11 further comprising a seventh line extending from a steam turbine to said input of said second combination unit.

13. A cooling system for a boiling water reactor having a primary containment vessel, a reactor pressure vessel surrounded by said primary containment vessel, a nuclear fuel core arranged inside said reactor pressure vessel, a single pool of water located inside said primary containment vessel and outside said reactor pressure vessel, and a condenser pool of water located outside and above said primary containment vessel, said cooling system comprising:
    a plurality of combination primary containment cooling and residual heat removal condensers submerged in the condenser pool, each of said combination primary containment cooling and residual heat removal condensers having an input and a single output, said input connected to said condenser through an upper drum, and said single output connected to said condenser through a lower drum;
    a plurality of first lines extending from said reactor pressure vessel to said inputs of said combination primary containment cooling and residual heat removal condensers;
    a plurality of second lines extending from said primary containment vessel to said inputs of said combination primary containment cooling and residual heat removal condensers; and
    a plurality of third single output lines for carrying condensed steam and noncondensable gases from said single outputs of said combination primary containment cooling and residual heat removal condensers to the single pool located inside said primary containment vessel, each said single output third line extending from said single output of separate combination containment cooling and residual heat removal condenser to the single pool located inside said primary containment vessel, each said third single output line having an output submerged in said single pool located inside said primary containment.

14. A cooling system in accordance with claim 13 wherein said first lines comprise a portion of at least one main steam line from the reactor pressure vessel.

15. A cooling system in accordance with claim 13 further comprising at least one isolation valve in each of said first lines, said isolation valve having an open and a closed state, when said isolation valves are in said open state, steam is allowed to flow through said first lines to each of said combination primary containment cooling system and residual heat removal condensers, and when each of said valves are in said closed state, steam is not allowed to flow through said first lines to said combination primary containment cooling system and residual heat removal condensers.

16. A cooling system in accordance with claim 13 further comprising at least one isolation valve located in each of said second lines from said primary containment vessel to said inputs of said combination primary containment cooling system and residual heat removal condensers.

17. A cooling system in accordance with claim 13 further comprising a fourth line from a steam turbine to said input of at least one of said combination primary containment cooling system and residual heat removal condensers.

18. A cooling system in accordance with claim 13 wherein said plurality of combination primary containment cooling system and residual heat removal condensers are arranged in a substantially linear arrangement on one side of the reactor pressure vessel.

19. A cooling system in accordance with claim 13 wherein at least one said combination primary containment cooling system and residual heat removal condensers is located on one side of the reactor pressure vessel and one of said combination primary containment cooling system and residual heat removal condensers is located on an opposite side of the reactor pressure vessel.

20. A cooling system for a boiling water reactor having a primary containment vessel, a reactor pressure vessel surrounded by said primary containment vessel, a nuclear fuel core arranged inside said reactor pressure vessel, a single pool of water located inside said primary containment vessel and outside said reactor pressure vessel, and a condenser pool of water located outside and above said primary containment vessel, said cooling system comprising first, second and third combination primary containment cooling and residual heat removal condensers submerged in the condenser pool, each of said combination primary containment cooling and residual heat removal condensers having an input and a single output, said input connected to said combination condenser through an upper drum, and said single output connected to said combination condenser through a lower drum, a plurality of first lines extending from said reactor pressure vessel to said inputs of said combination primary containment cooling and residual heat removal condensers, said first lines comprising a portion of at least one main steam line from the reactor pressure vessel, a plurality of second lines extending from said primary containment vessel to said inputs of said combination primary containment cooling and residual heat removal condensers, and a plurality of third single output lines for carrying condensed steam and noncondensable gases from said single outputs of said combination primary containment cooling and residual heat removal condensers to the single pool located inside said primary containment vessel, each said third single output line extending from said single output of a separate combination containment cooling and residual heat removal condenser to the single pool located inside said primary containment vessel, each said third single output line having an output submerged in said single pool located inside said primary containment, at least one isolation valve in each of said first lines, said isolation valves having an open and a closed state, when said isolation valves are in said open state, steam is allowed to flow through said first lines to each of said combination primary containment cooling system and residual heat removal condensers, and when each of said valves are in said closed state, steam is not allowed to flow through said first lines to said combination primary containment cooling system and residual heat removal condensers, at least one isolation valve located in each of said second lines from said primary containment vessel to said inputs of said combination primary containment cooling system and residual heat removal condensers.

* * * * *